(No Model.)
G. CURLEY.
SAUCEPAN COVER.
No. 566,744. Patented Sept. 1, 1896.
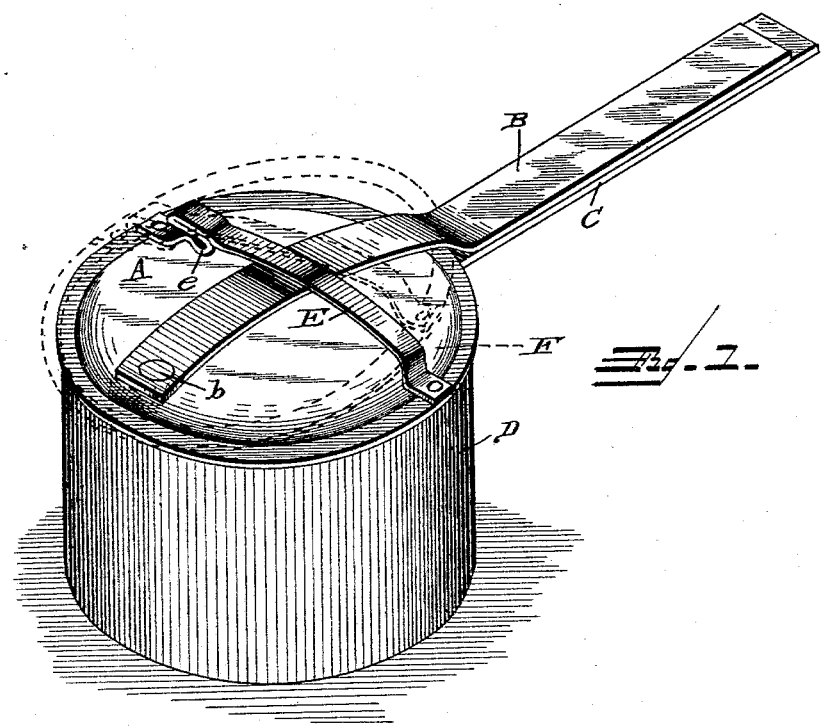
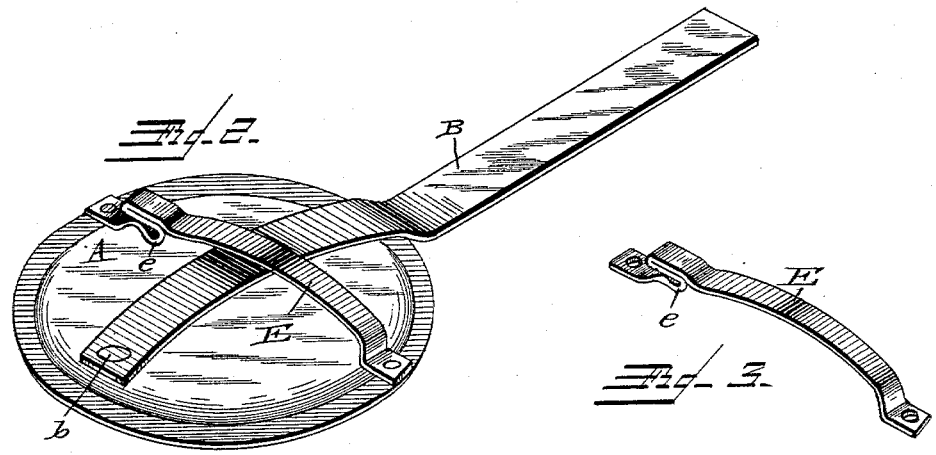
Witnesses
Jos. J. Gregory
K. A. Nau
Inventor
George Curley
By John Wedderburn
his Attorney.

UNITED STATES PATENT OFFICE.

GEORGE CURLEY, OF SALT LAKE CITY, UTAH.

SAUCEPAN-COVER.

SPECIFICATION forming part of Letters Patent No. 566,744, dated September 1, 1896.

Application filed January 8, 1896. Serial No. 574,714. (No model.)

*To all whom it may concern:*

Be it known that I, GEORGE CURLEY, a citizen of the United States, residing at Salt Lake City, in the county of Salt Lake and State of Utah, have invented certain new and useful Improvements in Saucepan-Covers; and I do hereby declare the following to be a full, clear, and exact description of the invention, such as will enable others skilled in the art to which it appertains to make and use the same.

This invention relates to certain new and useful improvements in saucepan-covers; and it has for its object, among others, to provide a cover by means of which the boiling water may be readily poured off from the vegetables or other contents of the saucepan without danger of burning the hands. The boiling water can be poured off from potatoes, cabbage, turnips, and all vegetables by the use of this device, which may be readily placed on any cover, and the covers can be made to fit any pans that are or may be made. The device can be made at small cost and used for an indefinite period.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a perspective view of a saucepan with its cover provided with my improvement. Fig. 2 is a perspective view of the cover and its handle, and Fig. 3 is a view of the attachment for guiding the handle on the cover removed.

Like letters of reference indicate like parts in the several views.

Referring now to the details of the drawings by letter, A designates a saucepan-cover, and B a handle pivotally connected therewith at one end, as at *b*, said pivot being arranged near one edge of the cover. This lever is curved to conform to the curvature of the outer face of the cover, and after extending beyond the edge of the cover opposite that to which it is pivotally attached it is extended substantially horizontally or a little inclined to constitute a handle which is designed to lie substantially parallel with the handle C of the saucepan D, as shown. This handle works beneath and is guided by the strip E, (shown detached in Fig. 3,) and which is arched or elevated near its center to form a space between the same and the top face of the cover in which said lever works. The ends of the strip are secured to the cover by solder or otherwise, and near one end it is bent upon itself, as seen at *e*, to form a stop to limit the movement of the cover with relation to the lever.

In practice the device is used as seen in Fig. 1, wherein by full lines the cover is shown in position to close the saucepan, while in dotted lines in the same figure the cover is indicated as moved around partially, so as to provide a space F, through which the boiling water may be poured from the saucepan and the contents retained therein against falling out. The handle of the lever is held by the thumb upon the handle of the saucepan and the cover moved on its pivot to the required degree.

Modifications in detail may be resorted to without departing from the spirit of the invention or sacrificing any of its advantages.

Having thus described the invention, what is claimed as new is—

1. A saucepan-cover provided with a handle pivotally attached thereto and extended at an angle to form a handle substantially parallel with the handle of the saucepan, substantially as described.

2. A saucepan-cover having a lever pivotally mounted thereon near one edge and extended to form a handle and a guide for said lever secured to the upper face of the cover, substantially as described.

In testimony whereof I have signed this specification in the presence of two subscribing witnesses.

GEORGE CURLEY.

Witnesses:
C. J. BRAIN,
C. B. MCGREGOR.